United States Patent
Davis et al.

(10) Patent No.: US 7,831,934 B2
(45) Date of Patent: *Nov. 9, 2010

(54) USER-INTERFACE FEATURES FOR COMPUTERS WITH CONTACT-SENSITIVE DISPLAYS

(75) Inventors: Mark Davis, Mill Valley, CA (US); Carlo Bernoulli, Basel (CH)

(73) Assignee: Palm, Inc., Sunnyvale, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 12/144,545

(22) Filed: Jun. 23, 2008

(65) Prior Publication Data

US 2009/0007025 A1  Jan. 1, 2009

Related U.S. Application Data

(63) Continuation of application No. 10/452,232, filed on May 30, 2003, now Pat. No. 7,406,666.

(60) Provisional application No. 60/406,264, filed on Aug. 26, 2002.

(51) Int. Cl.
 *G06F 3/00* (2006.01)
 *G06F 3/041* (2006.01)

(52) U.S. Cl. .............. 715/863; 715/810; 345/173; 345/179

(58) Field of Classification Search .......... 715/762, 715/763, 765, 767, 809, 811, 835, 837, 841, 715/863, 864; 345/172, 173, 179
See application file for complete search history.

(56) References Cited

U.S. PATENT DOCUMENTS

| | | | | |
|---|---|---|---|---|
| 5,276,794 A | * | 1/1994 | Lamb, Jr. | 715/202 |
| 6,069,623 A | * | 5/2000 | Brooks | 715/866 |
| 6,097,392 A | * | 8/2000 | Leyerle | 715/863 |
| 6,181,344 B1 | * | 1/2001 | Tarpenning et al. | 715/863 |
| 6,683,600 B1 | * | 1/2004 | Lui | 345/179 |
| 6,952,203 B2 | * | 10/2005 | Banerjee et al. | 345/179 |
| 2002/0015064 A1 | * | 2/2002 | Robotham et al. | 345/863 |
| 2004/0036680 A1 | * | 2/2004 | Davis et al. | 345/169 |
| 2005/0024341 A1 | * | 2/2005 | Gillespie et al. | 345/173 |

* cited by examiner

*Primary Examiner*—X. L Bautista
(74) *Attorney, Agent, or Firm*—Mahamedi Paradice Kreisman LLP

(57) ABSTRACT

Embodiments described herein provide for a portable computer with a contact-sensitive display having a user-interface that is configurable through user-contact with the display. An active input area may be provided that is configurable in appearance and functionality. The contents of the active input area, its functionality, and the manner in which it is oriented, particularly with respect to a left or right handedness, are described herein.

18 Claims, 8 Drawing Sheets

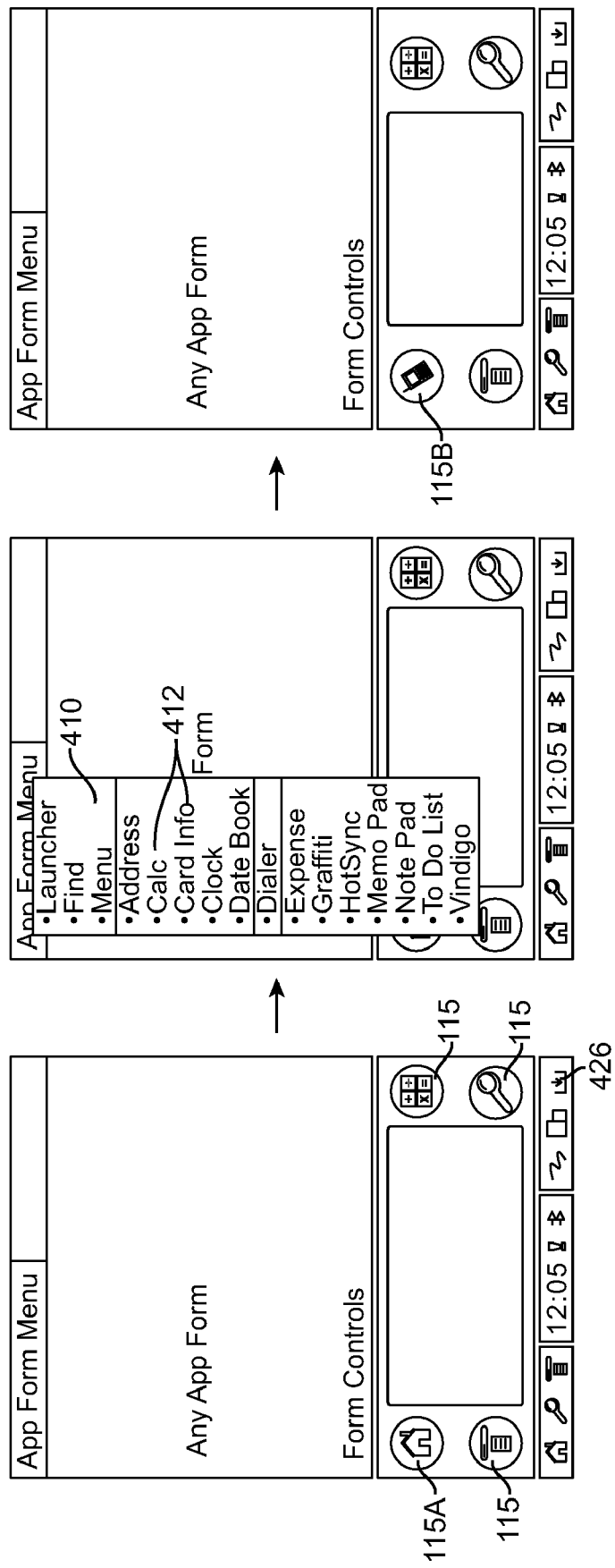

USER-INTERFACE FEATURES FOR COMPUTERS WITH CONTACT-SENSITIVE DISPLAYS

RELATED APPLICATIONS

This application is a continuation of U.S. patent application Ser. No. 10/452,232, filed May 30, 2003 now U.S. Pat. No. 7,406,666, and entitled "User-interface features for computers with contact-sensitive displays," which claims benefit of priority to U.S. Provisional Application No. 60/406,264, filed Aug. 26, 2002, entitled "User interface features for a handheld computer"; both of the aforementioned priority applications being hereby incorporated by reference in their entirety.

FIELD OF THE INVENTION

The present invention relates to user-interfaces for computers. In particular, the present invention relates to user-interface features for computers with contact-sensitive displays.

BACKGROUND OF THE INVENTION

Personal digital assistants (PDAs) are typical of computers that utilize contact-sensitive displays. A PDA is small in size, usually suited to be held by a user on one hand and operated by another hand. The display of the PDA is used to provide additional input functionality in lieu of a large keyboard, a mouse or other input mechanism that is incompatible with the size and portability of the PDA.

PDAs often provide an active input area on the display, which is a designated region on the display where most of the user-contact and input is entered. One type of active input area used in PALM OS and POCKET PC devices provides for a handwriting recognition area to appear on the display. The user can form strokes on the region of the display where the handwriting recognition area is provided, and technology such as provided by GRAFFITI or JOT, is used recognize the strokes as characters.

Because the handwriting recognition area is often a frequent location of the user's attention, other input functionality is usually provided in conjunction with or next to the handwriting recognition area. This other input functionality is often in the form of icons and task bars that can be selected in order to cause the PDA to perform some function. In addition, electronic keyboards can be substituted on the display in place of the handwriting recognition area.

Recently, devices such as TABLET PCs have become popular. Such devices also utilize an immediate handwriting recognition square for recognizing contact strokes provided on a display as characters.

SUMMARY OF THE INVENTION

Embodiments of the invention provide for a configurable user-interface for a computer. Embodiments of the invention may apply to a handheld computer, such as a PDA, having an active input area, where handwriting recognition or digital keyboards may be displayed.

According to one embodiment, input features such as icons provided with the active input area may be substituted in exchange for other input features.

According to another embodiment, a display of the handheld computer may be provided in a portrait mode, with a left or right handed orientation. In providing the handedness orientation, the placement and orientation of the active input area in relation to other portions of the display is considered in order to facilitate users who are either left or right handed.

Other embodiments provide a feedback feature that echoes back to the user a particular character that was just entered through a handwriting recognition scheme. The particular character that is echoed back may be a glyph (e.g. a character before it is displayed as an alphabet or Roman numeral character) that the handheld computer determines match to a handwriting stroke of the user.

Still further, another embodiment provides for a configurable handwriting recognition area for an active input area. In particular, the handwriting recognition area portion of the active input area may be configurable in terms of the number of cells provided, the shape of each cell, the functionality provided by each cell (e.g. what kind of characters are to be recognized in a particular cell) and the dimensions of each cell in both the lengthwise and widthwise directions.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIGS. 4A-4C illustrate screen shots of an icon in an active input area being replaced by another icon.

DETAILED DESCRIPTION OF THE INVENTION

Figure 1:
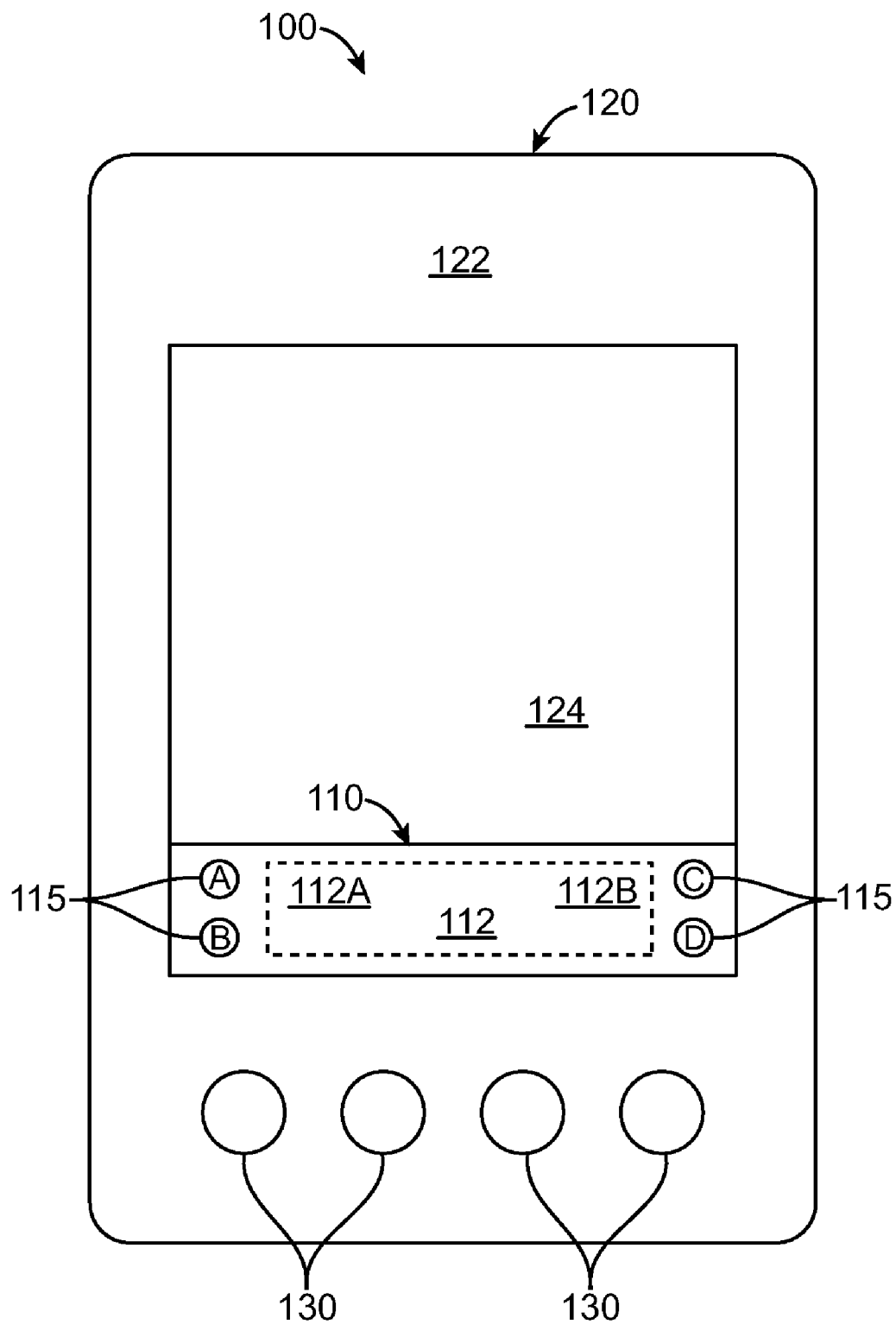
FIG. 1 is a simplified frontal view of a handheld computer with a configurable active input area, under an embodiment of the invention.

Embodiments of the invention provide a set of configurable user-interface features for computers that have contact-sensitive displays. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. OVERVIEW

Embodiments described herein provide for a portable computer with a contact-sensitive display having a user-interface that is configurable through user-contact with a display surface. In some embodiments, an active input area is provided that is configurable in appearance and functionality. As well be described, the configurable nature of the active input area allows for a flexible user-interface that can accommodate, amongst other considerations, left and right handedness, special business applications, and user-preferences.

For purpose of description, embodiments of the invention are described in the context of handheld computers, such as PDAs and smart cell phones, which use contact-sensitive displays. Handheld computers, in particular, illustrate the problem of maximizing user-interface functionality and preferences on a device with a relatively small profile. Embodiments of the invention may also be employed with other types of computers that have contact-sensitive displays, such as on tablet computers, laptops and other portable computers.

In one embodiment, a user-interface can be configured on a computer with a contact-sensitive display. A set of features that are selectable through contact with the display of the computer may be provided on a designated region of the computer's display. When selected, the features cause the computer to perform some function associated with that feature. A tap event, corresponding to an object making a specific form of contact with the display, may be entered by the user to initiate a substitution of one feature for another feature in the designated region. In response to the tap event, a list of alternative features is provided to the user. A selection of one of the alternative features is detected by a user once-again making contact with the display. Then the selected alternative feature is provided on the display instead of the feature that was associated with the tap event.

According to another embodiment, a portable computer is provided that includes a housing, a contact-sensitive display and a processor. The processor is configured to provide an active input area on the display. The active input area includes functionality where the processor recognizes strokes entered on the display as characters. The portable computer may be oriented in a portrait mode, where the active input area extends primarily in a left-right direction from a perspective of a user that operates the portable computer. The portable computer may also be oriented in a landscape mode, where the active input area extends primarily in a top-bottom direction from the perspective of the user. When in the landscape mode, the processor is configured to provide a handedness orientation for the active input area with respect to the display and other features of the handheld computer 100.

B. ACTIVE INPUT AREA

With respect to embodiments such as described below, an active input area refers to a graphic, contact-sensitive input mechanism provided on a display surface of a computer. The active input area provides functionality that is oriented for making the active input area the primary focus of the user when the user is interacting with the computer. Accordingly, the active input area may provide a handwriting recognition area, keypad, and/or a keyboard that enables a large number of possible user contacts to be entered and uniquely interpreted from one designated region of the display. To provide an example, in one embodiment, an active input area may include a display region designated for recognizing certain user-contacts as character input, including alphabet and numeric characters. The active input area may also be used to receive commands from the user for performing functions such as launching applications. In this way, an active input area may differ from other user-interfaces of a computer (such as mechanical features like keyboard and buttons) in that it is provided on a contact-sensitive display, and it can be used to receive a large number of unique user-inputs that can subsequently be interpreted.

FIG. 1 illustrates a handheld computer 100 with a configurable active input area 110, under an embodiment of the invention. In FIG. 1, handheld computer 100 includes a housing 120 having a front panel 122. A display surface 124 is exposed on the front panel 122. The display surface 124 may be part of a display assembly having a digitizer or other construction in which contact between an object and the display surface is detected and recorded. The housing 120 may also provide a plurality of buttons 130, or other actuatable mechanisms. The buttons 130 can be individually actuated to cause handheld computer 100 to perform some function such as launch a program.

An active input area 110 is provided on display surface 124. In an embodiment, active input area 110 is purely digital, and can be selected to appear on display surface 124, rather than be a permanent aspect of the display surface 124. The active input area 110 includes a handwriting recognition area 112. A user may initiate contact with an object in the form of a gesture or stroke on handwriting recognition area 112, and the processing resources of handheld computer 100 interpret that stroke as a character or function. The handwriting recognition area 112 may be immediate in that a single stroke may be recognized as a character after that stroke is completed. A recognized character of an immediately recognized stroke may be outputted on display surface 124 prior to another stroke being entered.

The handwriting recognition area 112 itself may be separated into two or more cells. In one embodiment, a first cell 112A recognizes strokes as alphabetical characters, and a second cell 112B recognizes strokes as numbers. Additional cells may be provided as needed. For example, embodiments described below provide for a "triple-cell" configuration, where one cell of handwriting recognition area 112 is for recognizing strokes as capital letters. Alternatively, a third or additional cell may be for recognizing strokes as functions.

The active input area 110 also includes a plurality of active icons 115, which are placed adjacent to the handwriting recognition area 112. As used herein, the term "active icon" means an icon that has some functionality associated with it. An active icon can be selected to perform its associated function. Accordingly, active icons 115 are each individually selectable to cause the handheld computer 100 to perform a function that corresponds to that icon. Unless stated otherwise, reference to icons in this application is intended to mean "active icons". In one embodiment, a set of four icons 115 is provided around handwriting recognition area 112, although more or fewer icons may be provided as part of active input area 110 as needed or desired.

In one embodiment, one characteristic of the active input area is that it contains multiple user-interface features of different types. Another characteristic of an active input area is that even though it is formed from multiple elements with different functionality, the active input area appears as a unit. Thus, when active input area 110 is selected to appear, all of the elements designated to be part of the active input area at that particular moment appear with it. With respect to FIG. 1, this would mean that all of the active icons 115 and the handwriting recognition area 112 appear as the components of the active input area 110. Furthermore, these elements appear in the same configuration each time the active input area 110 is displayed. For example, each active icon 115 may occupy the same position relative to handwriting recognition area 112 each time active input area 110 is called on the display surface 124.

When not in use, an embodiment provides that active input area 110 may be minimized into a task bar or other graphic feature that appears on the display. One embodiment provides that the active input area 110 may be made to appear on display surface 124 at any time through one or more taps with the display surface 124. Thus, an area of display surface 124 can be maximized for providing content by minimizing active input area 110, thus facilitating use of handheld computer 100 as, for example, an electronic book reader.

Figure 2A:
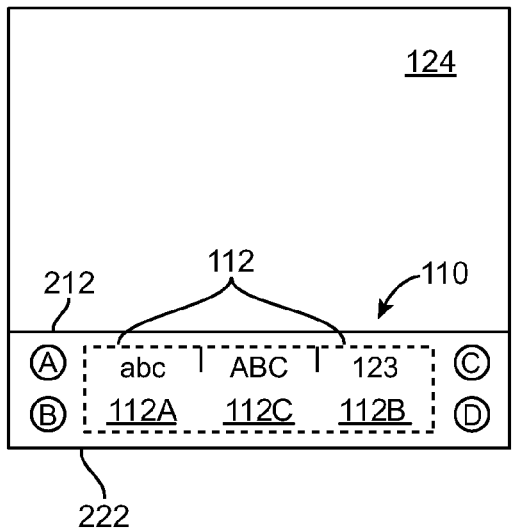
FIGS. 2A-2D illustrate screen shots of a configurable active input area, under one or more embodiments of the invention.

FIGS. 2A-2D provide screen shots of display surface 124 to illustrate where the appearance of active input area 110 may be altered or otherwise changed as needed or selected by a user of handheld computer 100. FIG. 2A illustrates an embodiment where a user selects to provide active input area 110 with a triple-cell configuration. The active input area 110 may also include active icons 115. In the triple-cell configuration, a first cell 112A (usually on the far left) interprets gestures made on that part of the display surface 124 as small cap characters. A second cell 112B (usually on the far right) interprets gestures made on that part of the display surface 124 as numbers. A third cell 112C, which may appear in the middle, interprets gestures made on that part of the display surface 124 as capitalized letters. Such a configuration may be set as a preference of the user.

Figure 2C:
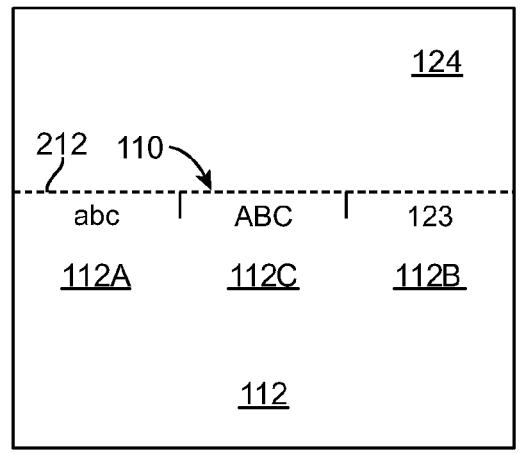
Figure 2B:
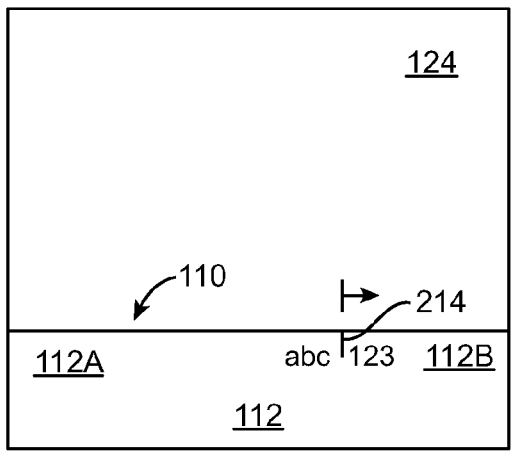

FIG. 2B illustrates another screen shot of how active input area 110 can be made to appear on the display surface 124. In an embodiment such as shown, active icons 115 are removed from active input area 110. Rather, all of active input area 110 is made into handwriting recognition area 112. Furthermore, cells 112A (for interpreting strokes as characters) and 112B (for interpreting strokes as numbers) are re-sized to be larger widthwise (along the axis X) than the configuration illustrated in FIG. 2A. Furthermore, the dimensions of the two cells 112A, 112B are non-symmetrical, in that cell 112A for characters is larger than cell 112B for numbers. As an example, a configuration such as shown in FIG. 2B may be designated as a user-preference because the user is more likely to use the character entry cell than the numeric entry cell.

FIG. 2C illustrates a configuration where active input area 110 is formed entirely of handwriting recognition area 112, and further that handwriting recognition area 112 has an enlarged height (along the axis Y). For purpose of illustrating variation, a triple cell configuration is also shown, in that a third cell 112C is also provided for recognizing capital letters.

Figure 2D:
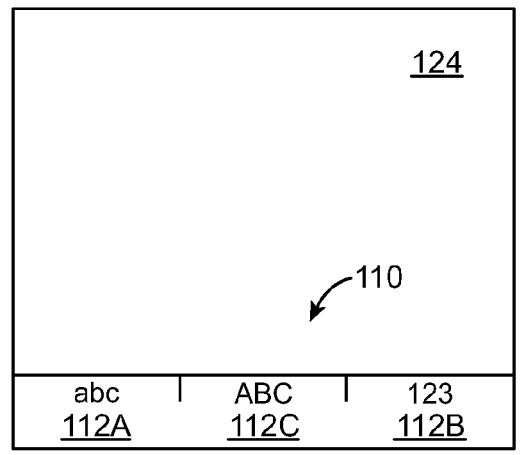

FIG. 2D illustrates a reverse configuration for active input area 110, where handwriting recognition area 112 is made smaller in height (along axis Y), but not minimized. Such an embodiment provides more room on display surface 124 for providing content, while providing some space for a user to enter strokes onto handwriting recognition area 112.

In an embodiment, active input area 110 is adjustable between various configurations, including configurations shown by FIGS. 2A-2D, through user-input with the display surface 124. In one embodiment, boundary lines 212 and 214 may be provided to delineate the active input area 110 from the remaining portion of the display surface 124. The boundary line 212 may correspond to a height of the active input area 110 from an edge 222 of the display surface. The boundary line 214 may correspond to a marker delineating the cells 112A, 112B of the handwriting recognition area 112. In order to adjust the position height of the active input area 110, one embodiment enables the user to select boundary line 212 to move it either upward or downward relative to bottom edge 222, to yield configurations shown by FIGS. 2A and 2D respectively. In order to adjust the dimensions of the cells 112A, 112B, the boundary 214 may be selected and moved to the left or right, such as shown by FIG. 2B. The selection of boundary lines 212, 214 may be done through contact with the display surface 124, or through some other means such as menu selection.

According to one embodiment, specific screen shots shown in FIGS. 2A-2D illustrate preferences that may be selected by the user. The user's selection may be based on factors such as whether display surface 124 is to be used primarily for displaying content, or whether character recognition is to be enhanced.

C. RECONFIGURING THE ACTIVE INPUT AREA

Embodiments of the invention provide for elements of active input area 110 to be selected and replaced by other elements as the need arises. As described by FIGS. 3 and 4A-4C, the selection and replacement of elements of active input area 110 may be done at the user level.

Alternatively, a manufacturer may provide the handheld computer 100 with a particular (or default) configuration for active input area 110. Subsequently, vendors or original equipment manufacturers may alter the configuration of the handheld computer 100 from its original manufacturing in order to suit a particular need. For example, active input area 110 may be configured to include elements (such as icons) for a particular internal business application of a company. In one use, an entity such as the company may alter the configurations of the active input area 110 one time, and disable the ability of the end user to subsequently reconfigure the active input area.

A more general application for an embodiment of the invention is to enable the end user to configure and reconfigure active input area 110 as the user desires. According to one embodiment, the active icons 115 that form part of active input area 110 can be selected and configured by a user of handheld computer 100. The user may, for example, switch the icons that appear in the active input area 110, alter the relative positions of such icons, and/or reduce, eliminate or increase the number of icons that appear as part of active input area 110. Once the selection of icons for the active input area 110 is designated by user-input or other means, an embodiment provides that the active input area 110 appears only with the designated selection of icons, at least until that selection is altered or replaced once again.

Figure 3:
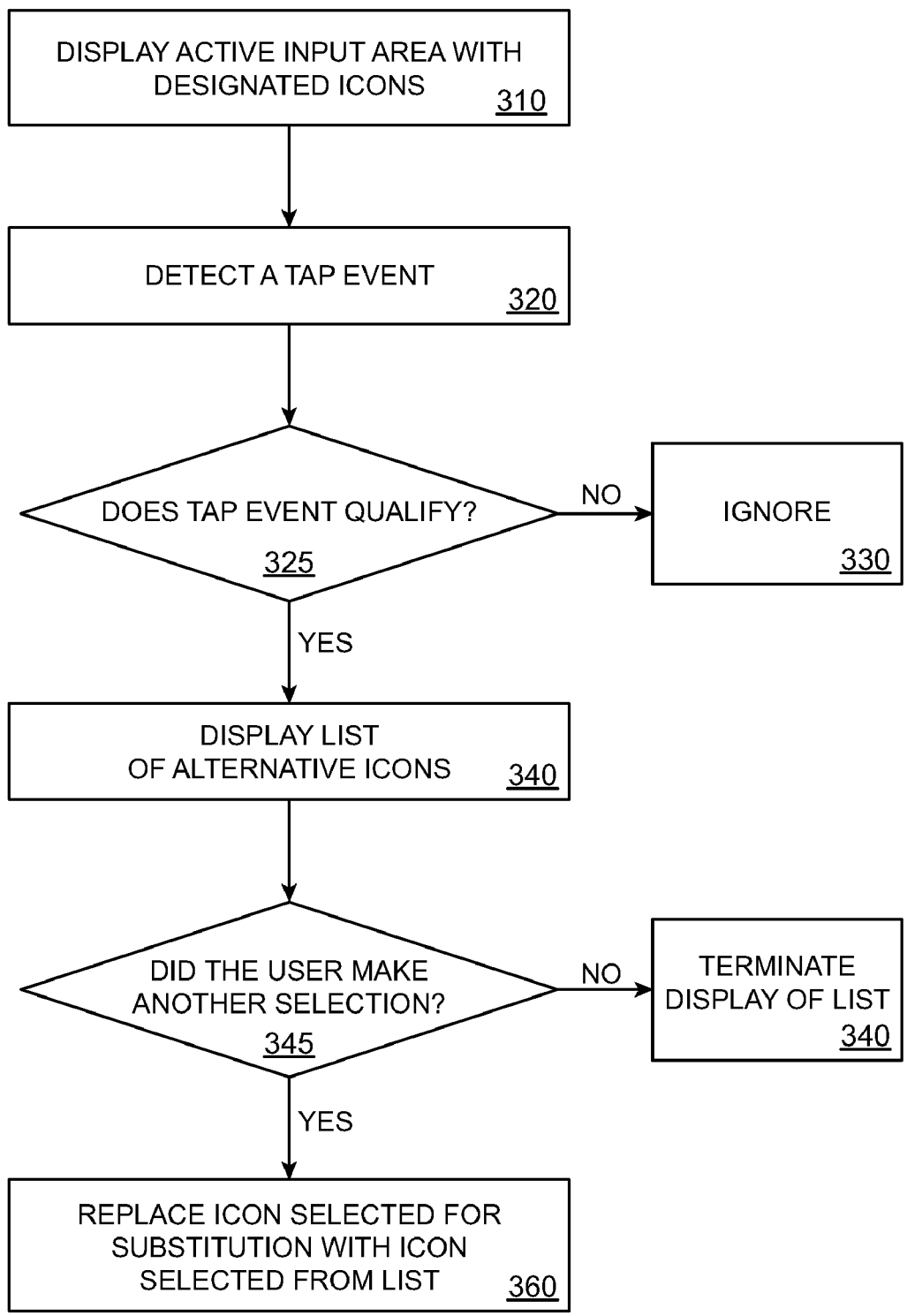
FIG. 3 describes a method for replacing elements of an active input area with other elements.

FIG. 3 illustrates a method for substituting out one of the active icons 115 that appear in active input area 110 for another icon that is selected by the user. Step 310 provides that the active input area is displayed with a designated set of active icons 115. Thus, the active icons 115 of active input area 110 may be displayed with a specific orientation, position, appearance and functionality.

In step 320, a tap event is detected that is associated with one of the icons that appears in the active input area 110. In one embodiment, the location of where the tap event occurs is what associates the tap event with a particular icon of active input area 110.

In step 325, a determination is made as to whether the detected tap event qualifies as a tap event for substituting out one of the active icons 115 (or some other feature of active input area 110) for an alternative icon. The determination may be based on whether the tap event qualifies based on some pre-determined criteria. This determination may distinguish such a tap event from other taps and tap events which are not for substituting out icons from active input area 110.

In one embodiment, the tap event is a "tap and hold" where an object such as a stylus is tapped to the display surface 124 and held in position for a designated duration. In such an embodiment, the duration in which the object making contact with the display is continuously held in contact with the display may form the criteria as to whether the tap event qualifies. The position where the tap and hold occurs may also be part of the criteria for qualifying the tap event. For example, in order to select a particular icon for replacement, the tap event may be required to occur over a particular active icon 115, and last a designated duration so that it is identified as a tap event to substitute out the particular icon. Should the tap occur elsewhere, or not for the designated duration, then the tap event would not be recognized as a tap event to substitute out that particular icon.

Rather than a tap and hold event, other embodiments may provide for other types of tap events. Examples of other such tap events include a "tap and drag" event, where the object is tapped to one place on display surface 124, then dragged continuously to another place on the display surface. For an embodiment where the tap event is a tap and drag, the criteria for qualifying the tap event may be that the first icon is tapped, then the object is continuously dragged across the display to another designated location.

Still further, another alternative form for a tap event is a double-tap or even a triple-tap. For example, a series of three taps within a relatively small duration of time that occurs over one of the icons 115 may be designated to qualify as a request to substitute out the selected icon. Other examples and scenarios are possible.

If the determination in step 325 is that the tap event was to not a request to reconfigure the selection of any of the icons 115 in the active input area 110, then step 330 provides that the tap event is ignored.

Step 340 provides that a list of the alternative icons is displayed in response to a determination that the tap event was to substitute out one of the active icons. The alternative icons may correspond to icons that are not presented in the active input area 110, but that are available in that they are each associated with a distinct functionality by the handheld computer 100. Thus, the selection of any icon provided in the displayed list would cause handheld computer 100 to perform some function associated with that icon. The list may display representations of the available alternative active icons. These representations may correspond to iconic expressions, such as insignias, trademarks, and other graphic associations to the underlying application or functionality.

Once the list is displayed, the user is given an opportunity to select a new icon to replace the icon that has been selected for substitution. In step 345, a determination is made as to whether the user made another selection for another icon to replace the first icon. In one embodiment, this selection may be made by the user tapping a representation of the second icon from the list provided in step 340. If the determination is that no selection was made from the list, then step 350 provides that the list is displayed until the user taps somewhere else on the display surface 124, or somehow initiates or causes some action to indicate that the list should be closed. For example, the user may launch another application with one of the buttons 130, or shut handheld computer 100 off.

If the determination is that a selection of the second icon is made from the list, then step 360 provides that the icon selected for substitution is replaced with the icon selected from the list. Until further alterations, this new icon will appear as part of the active input area 110 each time the active input area is selected to appear. In addition, the next time the list is displayed, a representation of the icon that was substituted out may be provided in the list, so that this icon may be re-selected at a later time as one of the elements of the active input area 110.

FIGS. 4A-4C provide screen shots to illustrate a method such as described in FIG. 3. FIG. 4A shows active input area 110 provided over a task bar 426. In one embodiment, the active input area 110 can be minimized or substituted out of the display. An icon or other item representing the active input area 110 may be provided on the task bar 426. This icon can be selected by a user through contact with the display, or other means, to cause the active input area to re-appear on the display surface 124. The task bar 426 may be persistent, in that it is either always present, or present automatically depending on certain applications or functions performed by the handheld computer 100.

FIG. 4A shows active input area 110 with four active icons 115 when in a displayed state. Each of the active icons 115 is assigned a particular function. When the user taps one of the active icons 115, the function associated with that icon is performed. Examples of functions that can be assigned to active icons 115 include launching a particular application, performing a utility function (such as displaying a search tool or adjusting the contrast of the computer), or opening a particular record. Rather than change the function associated with a particular icon, embodiments of the invention permit the particular icon displayed in the active input area 110 to be replaced by a new icon. With the changing of a particular icon, the functionality offered by that icon is changed in place of the functionality provided by the new replacement icon. Thus, the association between an icon in the active input area 110 and a function or application may be static. This allows the user to have the same visual association between a particular icon and the function associated with that icon.

FIG. 4A-4C illustrate how a first active icon 115A associated with a "display menu" function can be replaced by a second active icon 115B associate with a communication port application (referred to as "dialer"). The first active icon 115A is assumed to be selected for exchange for another icon by a tap event. The tap event that selects the first active icon 115A for exchange is different than a tap (or other tap event) that would select that and cause the handheld computer 100 to perform the function of the display menu icon. The act of selecting the first active icon 115A in order to cause the handheld computer 100 to perform the function associated with that icon may be performed simply by tapping the icon one time. In contrast, the tap event that selects the first active icon 115A for exchange with another icon may correspond to a stylus tapping on display surface 124 where first active icon 115A is provided, and holding the tap for a designated duration. Alternatively, the tap event for exchanging the first active icon 115A may correspond to the stylus dragging in contact with the display from a location where the first icon 115A is provided to some other location. Still further, the tap event for selecting the first active icon 115A for exchange may correspond to a double-tap or triple-tap on the location of the display surface where the first active icon 115A is provided. In either case, the tap event for selecting the icon for exchange with another icon is differentiable from the tap or tap event for performing the function of that icon, but the particular act required for the tap event may be one of design choice.

FIG. 4B illustrates a list 410 that is opened in response to first active icon 115A being selected for exchange with another icon. The list 410 includes a plurality of representations 412. Each representation 412 corresponds to an alternative active icon that is available to be displayed as part of active input area 110. Once the list 410 is opened, if one of the representations 412 is selected, an icon of that representation would be generated to replace the first active icon 1115A. In one embodiment, this would mean that the replacement icon would appear instead of the first active icon 115A, in first active icon's position within the active input area 110. The selection of one of the representations 412 in list 410 may be accomplished by a stylus making contact with a point on display surface 124 where that representation is displayed.

Since the representations 412 are fairly small, there is the possibility that what the user wishes to select and what the user actually selects is not the same thing. For example, the user may miss the desired representation when tapping the display surface 124. Embodiments of the invention provide a feedback function where the selected representation 412 is indicated to the user to afford the user an opportunity to change the selection before the selection is made final. In an FIG. 4B, the selection of one of the representations (the one corresponding to "dialer") is also visually indicated with some feedback. The feedback may correspond to highlighting the selected representation when it is selected from the list. Alternatively, the feedback may correspond to changing the appearance of the selected representation, such as changing its color, size, or shading. As another example, a distinctive audible may be provided to distinguish which representation 412 from the list 410 was selected from the user.

In addition to providing feedback, the list 410 may visually indicate information about the alternative icons, or about the functionality associated with those alternative icons. Fir example, the list 410 may indicate if certain applications are not available by graying out representations 412 that correspond to those applications.

For purpose of explanation, the particular representation selected in FIG. 4B is assumed to correspond to a second active icon 1115B. FIG. 4C illustrates when second active icon 115B is displayed in active input area 110 in place of first active icon 115A. The second active icon 115B takes the place of first active icon 115A in active input area 110. Thus, second active icon 115B occupies the relative position previously occupied by the first active icon 115A in active input area 110. The first active icon 115A is no longer present in active input area 110, but it is available for reselection and exchange with any other icon that is part of the active input area 110. When active input area 110 is subsequently called or used, active input area appears with second icon 115B, at least until the active input area is re-configured.

In the past, when the user of the handheld computer 100 wished to associate new iconic functionality within active input area 110, the user had to associate that new functionality with an icon that always appeared within the active input area. This required the user to learn a new visual association between that icon of the active input area 110 and the newly selected functionality that was to be provided with the active input area. In contrast, embodiments such as described with FIGS. 4A-4C enable the user to create static associations between icons that can appear in the active input area 110 and their respective functionalities. If the user wants a new functionality to be provided by an icon in the active input area 110, the user selects a new icon for the active input area which already has that functionality assigned to it. The user does not need to select a new function for an icon that cannot be substituted out of the active input area 110.

Furthermore, embodiments such as described in FIGS. 4A-4C enables active input area 110 to carry icons created by third-party developers for particular applications. Application developers often create the icons that are associated with their programs. The icons are provided in order to let the user launch an application by selecting the icon associated with that icon. Typically, the icons designed by the developers include graphics such as insignias and trademarks, which uniquely identify their application to the user. These icons are often listed in the menu of the handheld computer 100. With conventional handheld computers, the icon corresponding to the menu function is usually presented in the active input area 110, but the various icons that represent different applications, including third-party developer applications, are not part of the active input area. In contrast, some conventional computers require the user to select a new function for a wildcard icon that always appears on the display, or switch the functionality of one icon (such as the menu icon) in order to assign that icon a new functionality. With embodiments such as described, however, the icons designed and provided by the developers can be imported by the user (or a vendor) into the active input area 110.

In an embodiment, the handheld computer 100 is configured to display the icons that form the active input area 110 using monochromatic display resources. All of the active input area 110, including handwriting recognition area 112, may be provided using monochromatic resources, even if handheld computer 100 has color display resources. Monochromatic resources offer the advantage of being able to display content designed for both color and monochrome. There are many applications which are designed for monochrome environments. By providing for the handheld computer 100 to display the icons of active input area 110 in monochrome, no special consideration needs to be made to distinguish icons made for color from icons made for monochrome, as both types of icons would be displayed in the active input area 110 in monochrome.

While embodiments described with FIGS. 4A-4C contemplate the use of icons as a type of feature that can be switched from and into the active input area 110, embodiments of the invention may apply to other types of features. For example, handwriting recognition area 112 may be switched out of the active input area 110 in the same manner as the active icons. The handwriting recognition area 112 may be switched out in place of a digital keyboard, or a set of icons. Alternatively, the specific type of handwriting recognition area 112 that forms part of the active input area 110 may be selected in a manner such as described with FIGS. 4A-4C. For example, a two-cell version of handwriting recognition area 112 (see FIG. 2B) may be substituted for a triple-cell version (see FIG. 2B) in a manner described above.

D. STROKE RECOGNITION ASSISTANCE

It is possible for handheld computer 100, or other computer with a contact-sensitive display, to accept character entry on any location of display surface 124. The acceptance of the character entry may be through display contact mechanisms, such as electronic keyboards and handwriting recognition area. In the case where handwriting recognition is employed, the handheld computer 100 is configured to recognize strokes entered anywhere on display surface 124, where each stroke is immediately recognized as a corresponding character. For example, handheld computer 100 may be configured to recognize certain strokes, such as provided in GRAFFITI and JOT, as characters or commands when those strokes are entered on locations of display surface 124 other than active input area 110. In the case where an electronic keyboard is provided, the electronic keyboard itself may be provided anywhere on the display surface 124. Any taps entered on regions corresponding to keys of the electronic keyboard are recognized as corresponding characters.

With either stroke recognition or electronic keyboard entry, some degree of error exists in what is entered by the user and what is interpreted by the handheld computer 100. The display surfaces 124 are often small, causing the user to miss a key, or not enter a stroke correctly. In the case of handwriting recognition, a user is required to draw the stroke to match one of a set of known strokes. If the user's stroke is off, the handheld computer 100 may recognize the wrong character or command.

In an embodiment, active input area 110 has functionality other than that of receiving input. One embodiment provides that active input area 110 can be used as a visual guide for assisting the user to enter correctly shaped strokes on a remaining portion of display surface 124. For purpose of explanation, the following terminology is used in this application: a glyph is a recognized form of a stroke; and a stroke is what is traced by a user employing an object to make continuous contact (e.g. between a pen-up and a pen-down) with the display surface 124. In one embodiment, immediate handwriting recognition can be performed by matching a stroke to a glyph, and then displaying a character associated with the glyph. U.S. Pat. No. 6,493,464 (hereby incorporated for all purposes in its entirety by this application) describes an immediate handwriting recognition technique using strokes and glyphs.

Figure 5B:
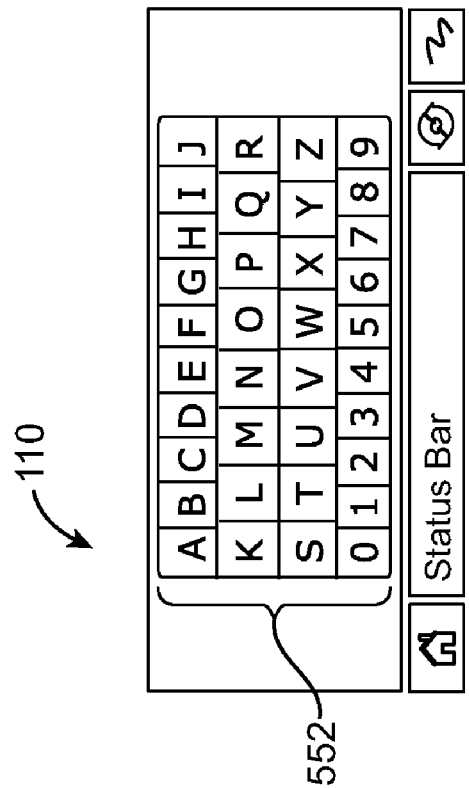
FIGS. 5A-5B illustrate screen shots of a handwriting recognition aid, under an embodiment of the invention.
Figure 5A:
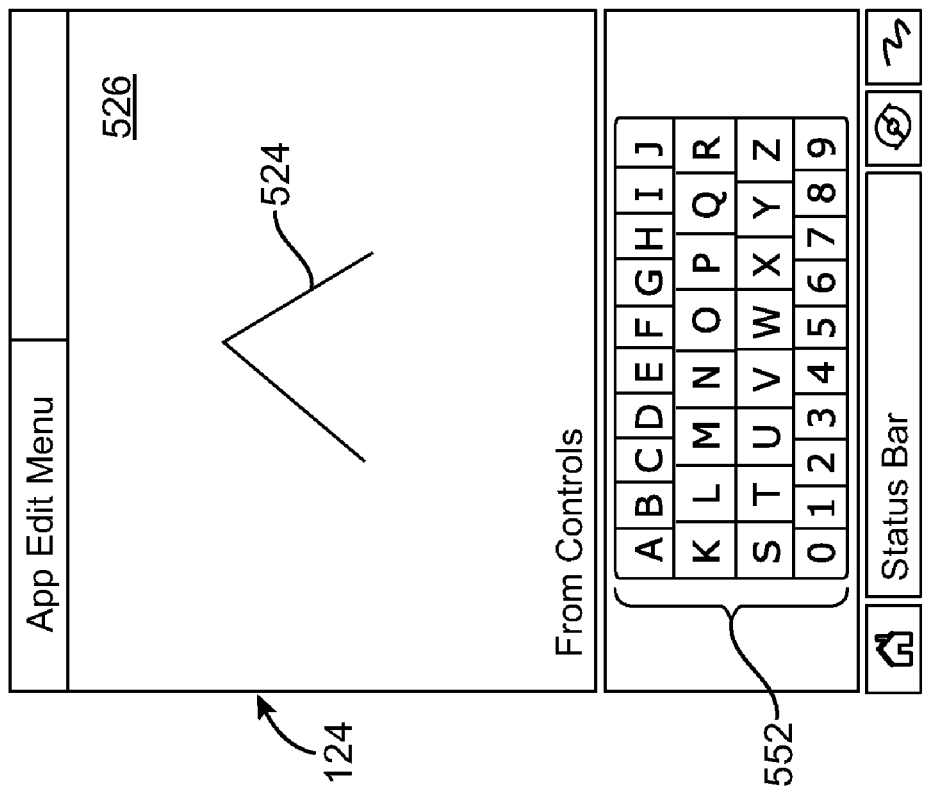

With reference to FIG. 5A, active input area 110 displays a set of glyphs 552. The region 526 of display surface 124, which excludes active input area 110, is shown as displaying a stroke 554 recently formed by the user. The stroke 554 may have been formed by, for example, the user tracing a shape on the region 526. Since the stroke 524 needs to match a shape of a desired glyph in the set of glyphs 552 in order to be properly recognized, displaying the set of glyphs in the active input area 110 is useful for providing a visual cue for the user. Such an embodiment may be particularly useful in the case where the user is unfamiliar with the particular stroke recognition technique used by the handheld computer 100 (such as GRAFFITI or JOT). Thus, active input area 110 may also serve as a feedback mechanism for providing visual feedback of a user's input operations.

According to another embodiment, active input area 110 provides a visual feedback as to the character that was identified from the stroke 554 that the user entered on the region 526. For example, for stroke 554, active input area 110 may display or somehow indicate simultaneously which character was recognized from that stroke. In FIG. 5B, an indication is shown as to which glyph in the set of glyphs 552 corresponded to the stroke that the user entered. The indication may be in the form of highlighting or shading one glyph that the handheld computer 100 determines to have matched the stroke 554 entered by the user onto the region 526.

E. HANDEDNESS ORIENTATION

The manner in which active input area 110 and other user-interface features are provided on handheld computer 100 may be accommodating for landscape modes, with particular handedness configurations. Specifically, the active input area 110 and other input features can be provided on display surface 124 in a landscape mode, with a particular left handed or right handed orientation.

Different handedness configurations can be provided because the construction of active input area 110 enables flexibility as to how it can be shaped and positioned. Specifically, when active input area 110 is electronically generated, the particular portion of display surface 124 upon which the active input area is displayed can be selected. Simultaneously, resources for detecting contact to display surface 124 may be oriented to recognize the particular forms of contact that correspond to the numerous entries that can be made through the active input area 110. Thus, active input area 110 can be created and recreated with physical characteristics that suit a particular configuration, such as a handedness orientation. In particular, the position, dimension, shape, orientation and even components of active input area 110 are selectable based on orienting all of the features according to a particular handedness.

Figure 6C:
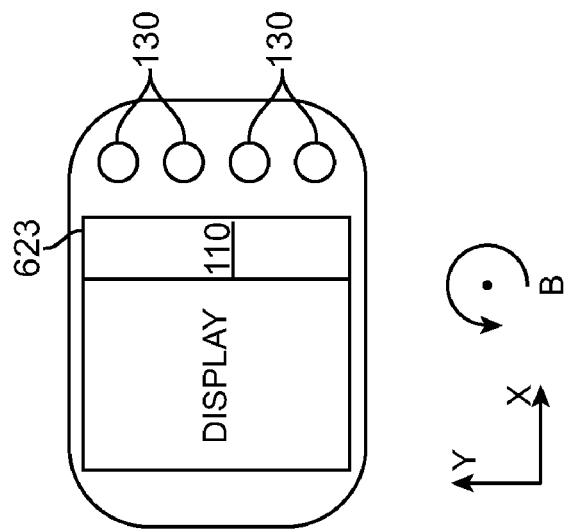
FIGS. 6A-6C are simplified frontal views of a handheld computer that has user-interface features which can be positioned to facilitate landscape modes with handedness orientation.
Figure 6B:
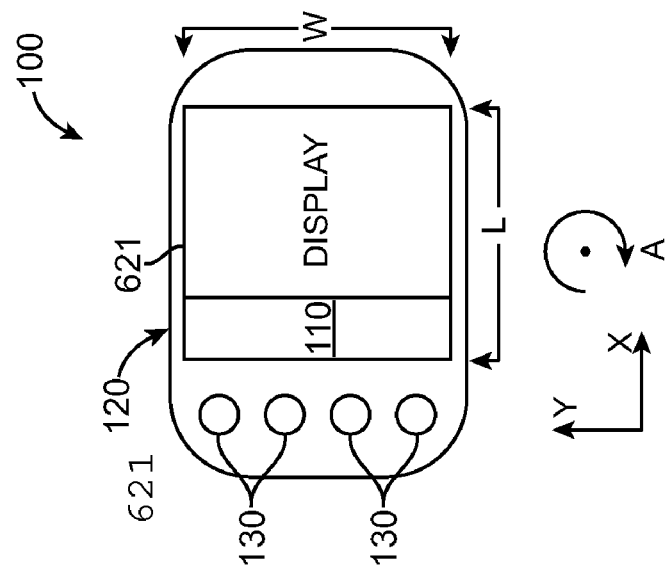
Figure 6A:
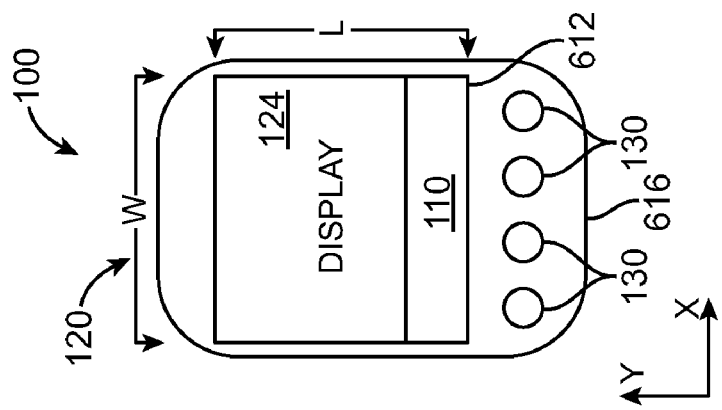

FIGS. 6A-6C shows how the flexibility in the manner active input area 110 is provided can be used to accommodate various preferences of the user, including left or right handedness of the user in the landscape mode. In FIG. 6A, the handheld computer 100 is shown in a portrait mode, which may be the default configuration of the handheld computer. The display surface 124 is assumed to be rectangular in shape, and the portrait mode corresponds to when the length of the display surface extends in an up-down direction from the perspective of the user. The perspective of the user is shown by the axes X and Y, with the X axis corresponding to what the user views as being the up and down direction. The perspective offered with the axes X and Y is that of the user staring into the paper.

With reference to FIG. 6A, active input area 110 extends a height from a bottom surface 612 of display surface 124. The buttons 130 are provided between the bottom surface 612 of display surface 124 and a bottom edge 616 of the housing 120. Based on convention, active input area 110 may be provided at the bottom portion of display surface 124. The active input area 110 may include active icons 115.

FIG. 6B illustrates handheld computer 100 positioned in a landscape mode, with a left handed orientation. The left handed orientation means that most, if not all, of the user-interface features that require the user to make manual contact with handheld computer 100 are provided on the left-hand side of the handheld computer. The active input area 110 is positioned so that when used by a left-handed person, the person's hand will not block the user's view of the display surface 124. The left-hand orientation may be created by rotating display surface 124 clockwise 90 degrees in the direction of A. When rotated, housing 120 provides the buttons in the top-down configuration, to the left of display surface 124. The active input area 110 may be re-generated to extend the same manner as in the portrait mode. Thus, active input area 110 extends in a top-bottom direction, as defined by axis X, but adjacent to a left boundary 621 (when viewed in the configuration of FIG. 6B) of the display surface 124.

FIG. 6C illustrates handheld computer 100 positioned in a landscape mode, with a right handed orientation. As with the left handed orientation, most or all of the user-interface features that require the user to make manual contact with handheld computer 100 are provided on the right-hand side of the handheld computer. The active input area 110 is positioned so that when used by a right-handed person, the person's hand will not block the user's view of the display surface 124. The right-hand orientation may be created by rotating display surface 124 counter-clockwise 90 degrees in the direction of B. When rotated, housing 120 provides the buttons in the top-down configuration, to the right of display surface 124. The active input area 110 may be re-generated to extend the same manner as in the portrait mode. Thus, active input area 110 extends in a top-bottom direction, as defined by axis X, but adjacent to a right boundary 623 (when viewed in the configuration of FIG. 6C) of the display surface 124.

Among other advantages, handheld computer 100 can be configured to enable its contact-sensitive display to be viewed and used in a landscape mode with particular attention to the handedness of the user.

Figure 7A:
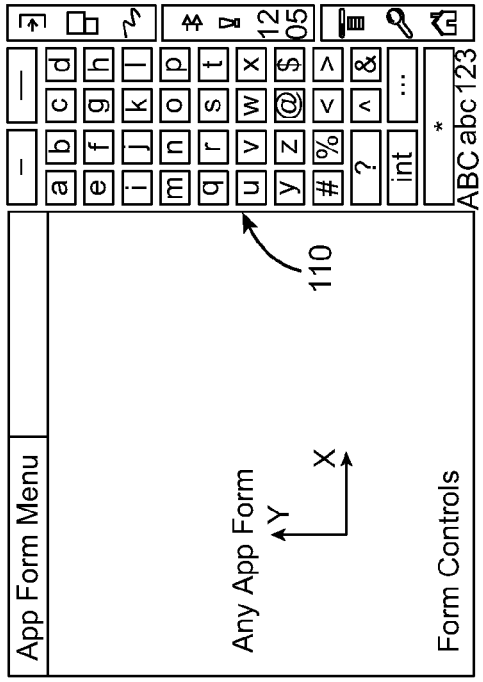
FIGS. 7A-7D illustrate screen shots of a display of a handheld computer where different active input areas are displayed in left and right handedness orientations.
Figure 7B:
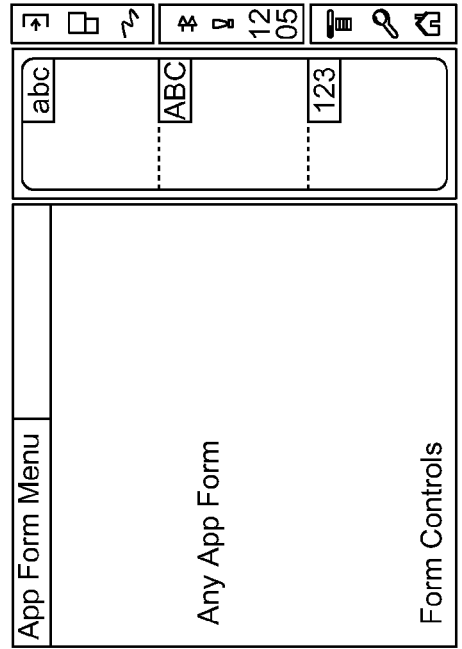

FIGS. 7A-7D show some specific examples of display surface 124 accommodating different modes and handedness. FIG. 7A illustrates the portrait mode for display surface 124, with the length of the display surface 124 extending in the top-bottom direction, along the axis Y. In the example provided, active input area 110 is displaying a set of keys corresponding to special character and number keys. In FIG. 7B, the active input area 110 is rotated into the right-handed landscape orientation. The same set of keys provided in the active input area 110 with FIG. 7A now are stacked vertically, so that the length of the active input area 110 extends in the direction of the axis Y.

Figure 7C:
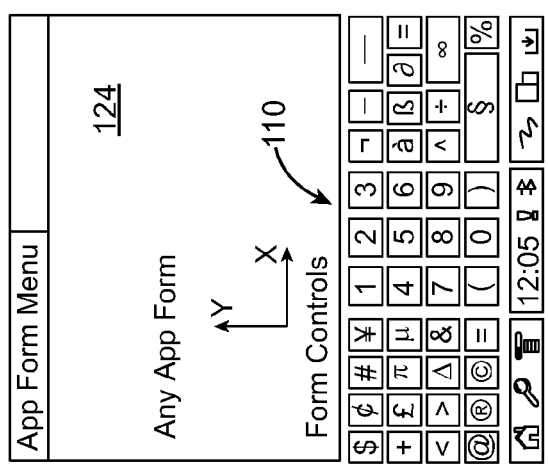
Figure 7D:
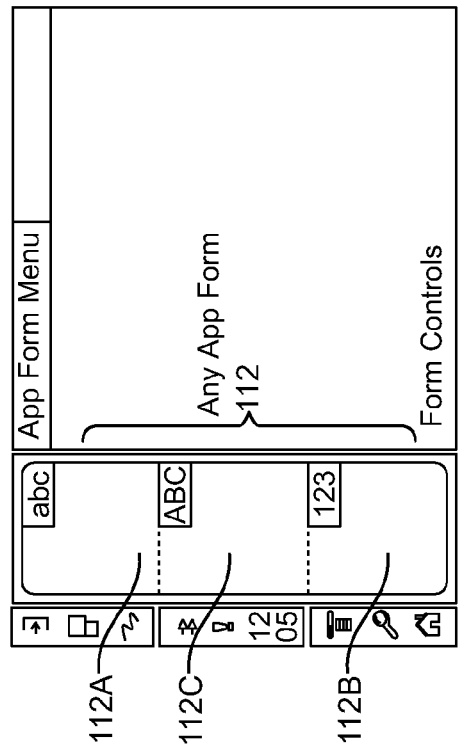

FIGS. 7C and 7D illustrate the active input area 110 with cells that comprise the handwriting recognition area 112. When in the portrait mode, an embodiment provides that the left cell 112A, the right cell 112B and the center cell 112C of the handwriting recognition area 112 are provided to receive strokes as input. In FIG. 7C, the left-handed landscape orientation is shown, with the cell 112A being in the top position within active input area 110, and the cell 112C being in the bottom most position. In the left-handed orientation, the active input area 110 appears to the left of the display surface 124. In FIG. 7D, the right-handed landscape orientation is shown. The right-handed orientation of FIG. 7D mirrors the orientation of active input area 110 in FIG. 7C, except that the active input area appears to the right of the display surface 124.

F. COMPONENTS OF A PORTABLE COMPUTER

Figure 8:
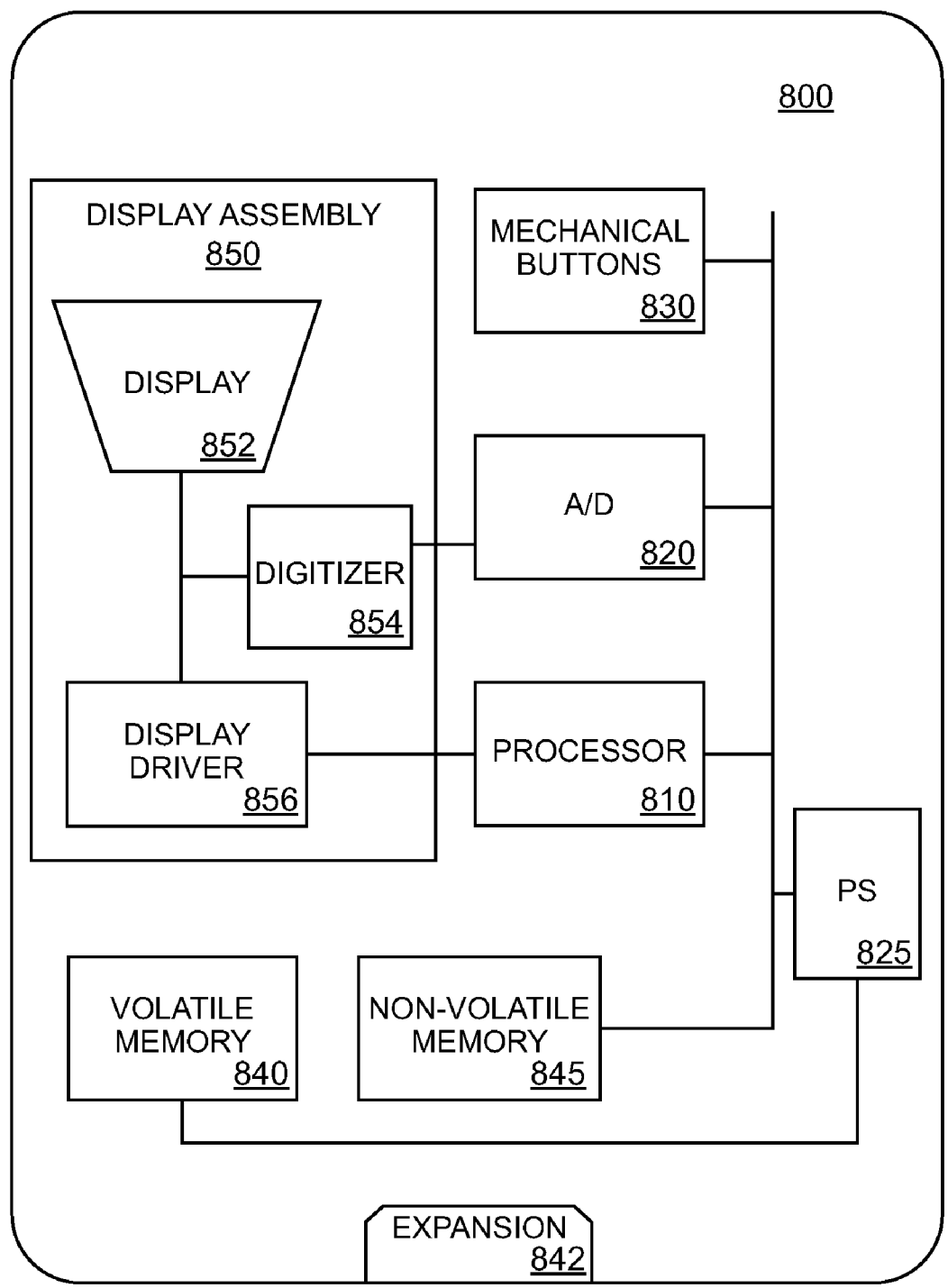
FIG. 8 is a block diagram that illustrates a portable computer upon which an embodiment of the invention may be implemented.

FIG. 8 illustrates the components of a portable computer 800, under an embodiment of the invention. The portable computer 800 may, for example, correspond to handheld computer 100. In an embodiment, portable computer 800 includes a processor 810, an analog-digital (A/D) converter 820, a set of mechanical buttons 830, a volatile memory 840, a non-volatile memory 845 and a contact-sensitive display assembly 850. A power source 825 may be used to power the various components of the portable computer 800. One typical component of the portable computer 800 is an expansion port 842. Typically, multiple such expansion ports are provided on such portable computers.

The contact sensitive display assembly 850 may include a display 852 and a digitizer 854. A display driver 856 may also form part of the display assembly 850. The digitizer 854 may be connected to the A/D converter 820. The digitizer 854 uses analog signals to detect contact with the display 852, and to track the object making the contact as it moves over the display. The A/D converter converts the signals into a digital form for processor 810, which interprets what input in entered by the contact with the display 852. The driver 856 may be coupled to the processor 810 in order to receive signals that are translated into output on the display 852. The output may correspond to content that appears on the display surface 124 in previous embodiments, as well as to the digitally-created active input area 110.

The display driver 856 may provide some or all of the monochromatic resources that are used to display icons, representations of the icons, and/or the active input area 110. As mentioned, the monochromatic resources enable the developer to make just one set of icons that work for all applications and all devices, since all such applications and devices can use monochrome, but not all such devices use color.

While an embodiment such as described with FIG. 8 provides for a display assembly that is integrated and formed as part of the housing of the portable computer 800, other embodiments may provide for a portable computer where the contact-sensitive display is remote to the housing of the portable computer, or at least to the housing where the processor 810 is provided. Such an embodiment may provide, for example, a projector that displays the content being provided by the processor 810 onto a surface such as a table. The portable computer 100 may sense the user's interaction with the surface where the projection is provided. Thus, the display surface may be external to the portable computer or its primary housing.

G. CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for configuring a user-interface of a computer, the method comprising:
   providing a set of one or more features within a designated region of a display of the computer, wherein each of the set of features is operable through contact between an object and the display in order to cause the computer to perform a function designated to be provided with that feature;
   detecting a tap event on the display of the computer;
   associating the tap event with a first feature in the set of features;
   displaying one or more alternate features that are not in the set of features in response to detecting the tap event;
   detecting, through contact between the object and the display, a selection of a second feature from the one or more alternate features; and
   providing the second feature instead of the first feature as one of the set of features provided within the designated region.

2. The method of claim 1, wherein the step of providing a set of one or more features within a designated region of a display includes displaying one or more features in the set of features as an active icon on the designated region of the display.

3. The method of claim 2, wherein the step of displaying one or more alternative features includes displaying a plurality of icons, wherein each icon represents one of the alternative features.

4. The method of claim 1, wherein detecting a tap event includes detecting a tap and hold of a stylus on the display.

5. The method of claim 1, wherein detecting a tap and hold of a stylus on the display includes detecting the tap on a region of the display where the first feature is being provided.

6. The method of claim 1, wherein detecting a tap event includes detecting a tap and a drag of the stylus on the display.

7. The method of claim 6, wherein detecting a tap and a drag of the stylus on the display includes detecting a tap of the stylus on a location of the display where the first feature is provided, and a drag of the stylus from the location to a new location.

8. The method of claim 1, further comprising displaying a list that includes an indication of each alternative feature, including the second feature, and wherein detecting a selection of a second feature includes detecting, through contact between the object and the display, a selection of one of the indications in the list.

9. The method of claim 8, wherein detecting a selection of one of the indications in the list includes detecting a tap on the display in a location where the one indication is being displayed.

10. The method of claim 1, wherein providing one or more features within a designated region of a display of the computer includes displaying a plurality of selectable icons, wherein each icon in the plurality of selectable icons has an iconic expression that distinguishes that icon from the other icons in the plurality of selectable icons.

11. The method of claim 10, wherein the step of providing the second feature includes displaying a second icon from the plurality of selectable icons.

12. The method of claim 1, wherein the step of providing the set of one or more features includes displaying the one or more features after a selection to view the one or more features.

13. The method of claim 1, wherein providing the set of one or more features includes displaying icons which can be selected through contact with the display in order to launch an application previously associated with that icon.

14. The method of claim 13, wherein after providing the second feature, the method further comprises:
    detecting a manual selection of the second icon, and
    launching the application previously associated with the second icon in response to detecting the manual selection of the second icon.

15. The method of claim 1, wherein detecting a tap event on the display of the computer includes detecting a tap on the display, and then qualifying the tap as a tap event for exchanging the first feature for another feature.

16. The method of claim 1, wherein qualifying the tap as a tap event includes determining that the tap has lasted for more than a designated duration.

17. A method for configuring a computer, the method comprising:
    providing a plurality of designated regions on a display of the computer in which icons are to appear, wherein the designated regions are part of an active input area, and wherein the active input area includes a handwriting recognition area that recognizes strokes entered upon that area as characters;
    detecting a tap event on a first designated region in the plurality of designated regions;
    in response to the tap event, presenting the user with a plurality of representations, each representation being for a corresponding icon that is assigned a particular function;
    detecting a user-selection of a first representation in the plurality of representations;
    assigning the icon corresponding to the first representation to the designated region; and
    designating the active input area to appear with the icon corresponding to the first representation.

18. The method of claim 17, further comprising replacing the icon corresponding to the first representation with another icon selected through another tap event.

* * * * *